United States Patent
Resch et al.

(10) Patent No.: US 10,031,805 B2
(45) Date of Patent: Jul. 24, 2018

(54) ASSIGNING SLICES TO STORAGE LOCATIONS BASED ON A PREDICTED LIFESPAN

(71) Applicant: International Business Machines Corporation, Armonk, NY (US)

(72) Inventors: Jason K. Resch, Chicago, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/232,288

(22) Filed: Aug. 9, 2016

(65) Prior Publication Data

US 2018/0046544 A1    Feb. 15, 2018

(51) Int. Cl.
  *G06F 11/10* (2006.01)
  *G06F 3/06* (2006.01)

(52) U.S. Cl.
  CPC .......... *G06F 11/1076* (2013.01); *G06F 3/064* (2013.01); *G06F 3/067* (2013.01); *G06F 3/0616* (2013.01); *G06F 3/0619* (2013.01); *G06F 3/0631* (2013.01); *G06F 3/0644* (2013.01)

(58) Field of Classification Search
  CPC ............. G06F 11/1076; G06F 11/1096; G06F 11/0793; G06F 3/0619; G06F 3/0665; G06F 3/0689; G06F 3/067; G06F 3/064; G06F 3/0644; G06F 3/0631
  See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Shelly A Chase
(74) *Attorney, Agent, or Firm* — Garlick & Markison; Timothy W. Markison; Randy W. Lacasse

(57) ABSTRACT

A computing device includes an interface configured to interface and communicate with a dispersed storage network (DSN), a memory that stores operational instructions, and a processing module operably coupled to the interface and to the memory such that the processing module, when operable within the computing device based on the operational instructions, is configured to perform various operations. The computing device determines characteristic(s) of encoded data slices (EDSs) of a data object and determines a first estimated class for the EDSs based on the characteristic(s) of the EDSs of the data object. The computing device then selects storage locations within storage units (SUs) of the DSN for the EDSs to be distributedly stored based on the first estimated class and collects write and/or delete request analytics associated with the EDSs. Based on updated information regarding the analytics, the computing device may then update/move/change the storage locations of the EDSs.

19 Claims, 6 Drawing Sheets

(56) References Cited

U.S. PATENT DOCUMENTS

| | | | |
|---|---|---|---|
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2014/0281804 A1* | 9/2014 | Resch | G06F 8/65 714/763 |
| 2014/0298085 A1* | 10/2014 | Baptist | G06F 11/0793 714/6.2 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

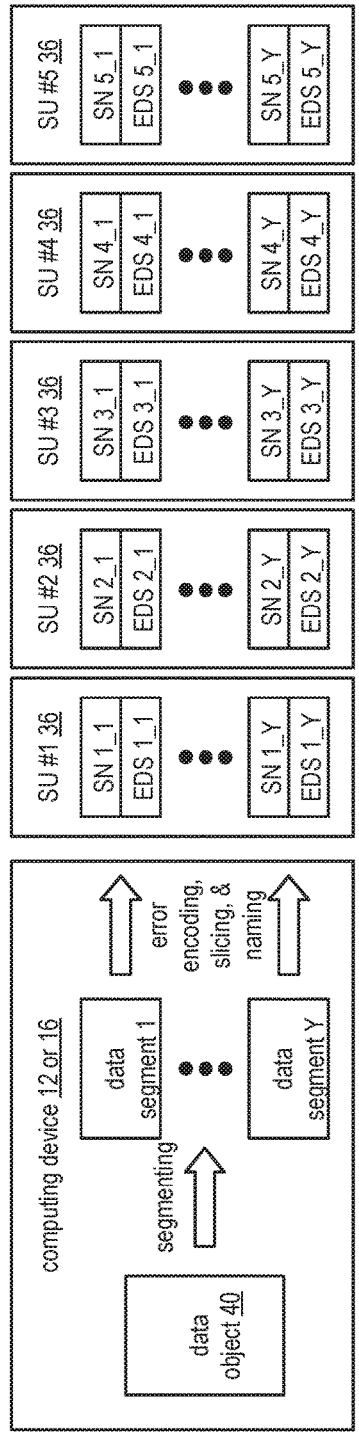

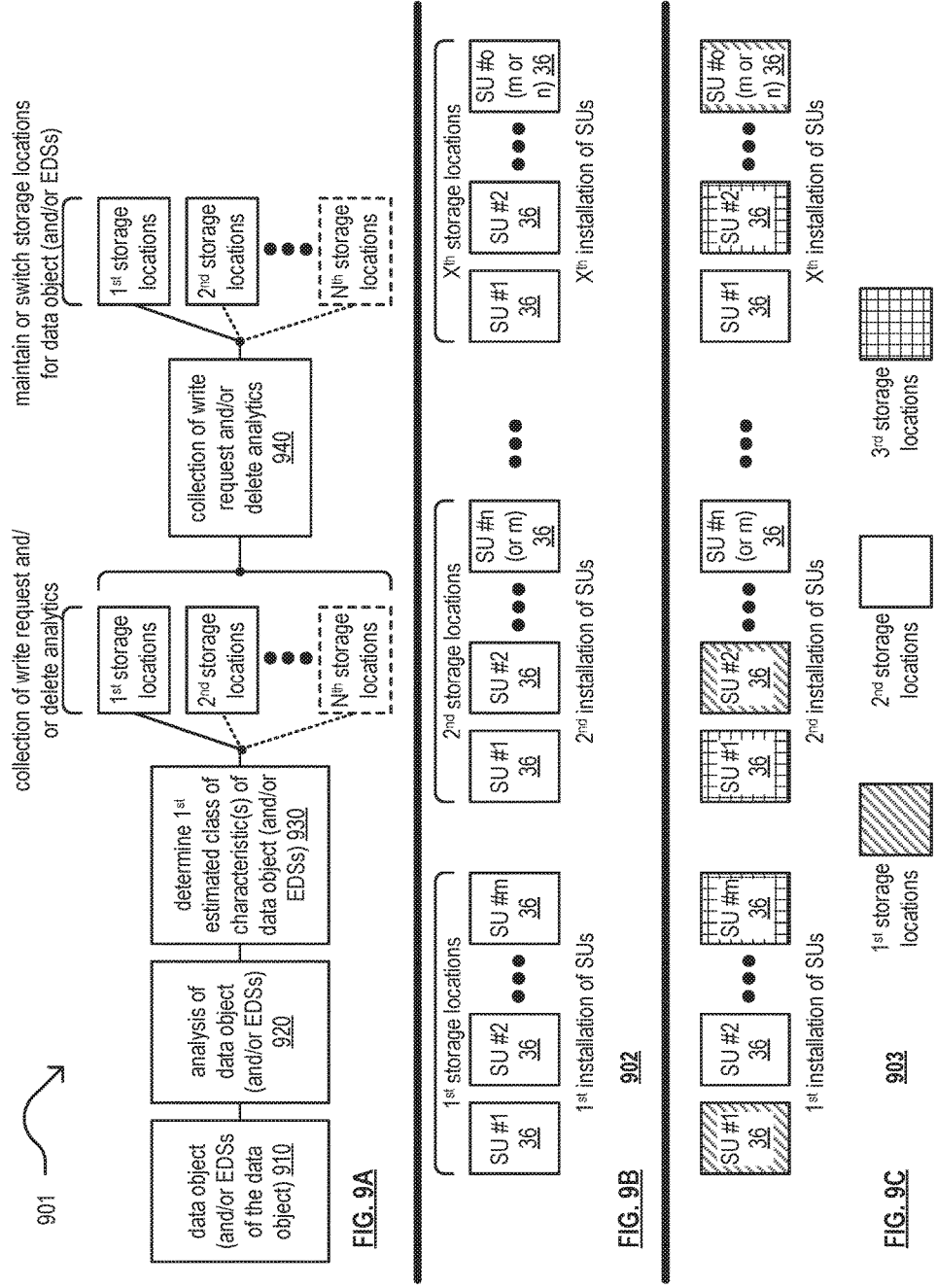

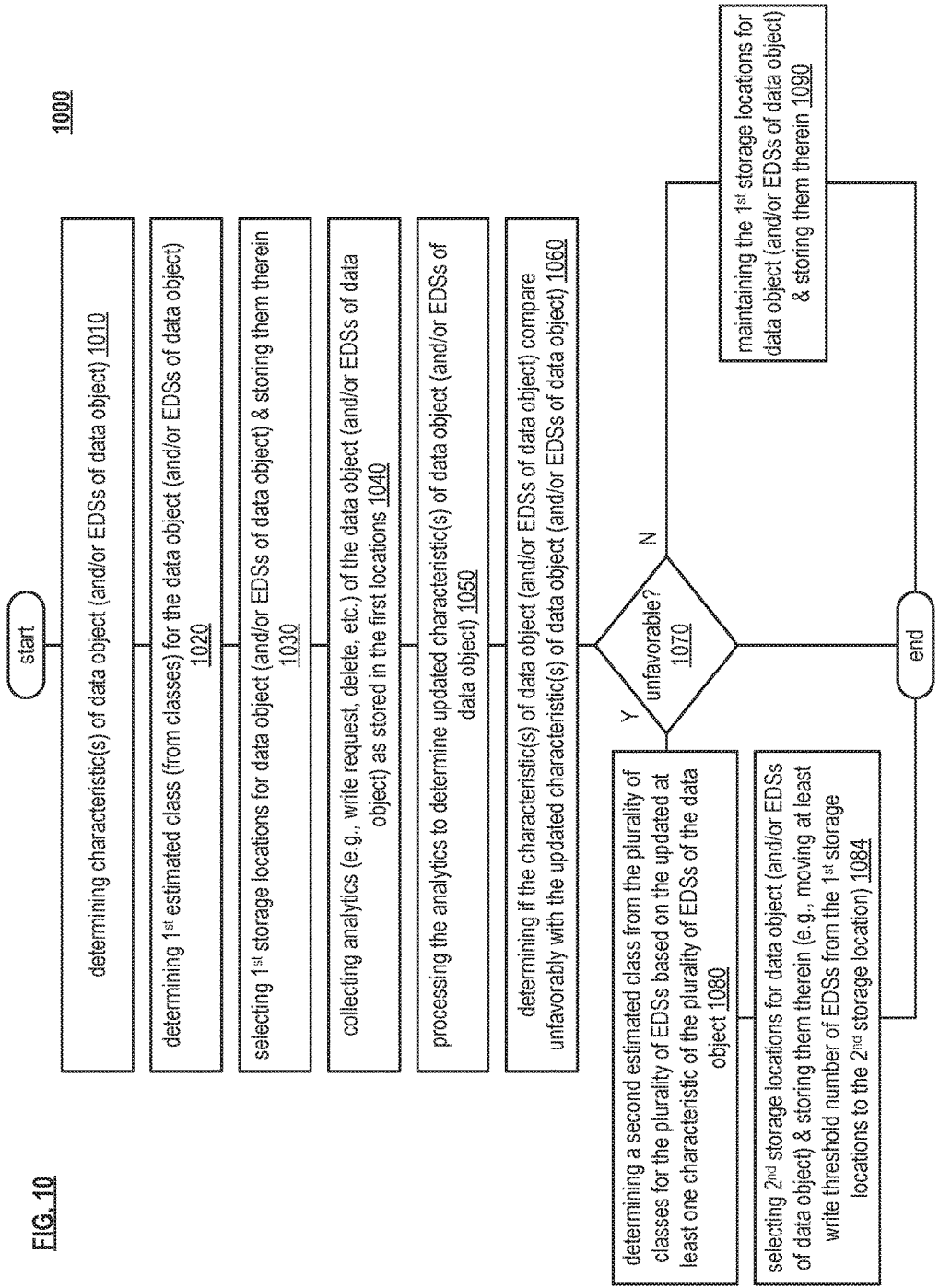

ASSIGNING SLICES TO STORAGE LOCATIONS BASED ON A PREDICTED LIFESPAN

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Some data stored within memory storage systems is not necessarily fixed or constant. For example, data may be modified, deleted, etc. over time in response to various reasons (e.g., user requests, updates, etc.). In addition, other data stored within memory storage systems may be relatively more fixed or more constant than other data and undergo modification, deletion, etc. very rarely. The prior art does not provide an adequate means by which data may be managed within such data systems to provide for effective overall storage and management of the memory storage system.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9A is a schematic block diagram of an example of data storage location management in accordance with the present invention;

FIG. 9B is a schematic block diagram of an example of various storage units (SUs) within different respective locations within a dispersed storage network (DSN) including different respectively sets of storage locations therein in accordance with the present invention;

FIG. 9C is a schematic block diagram of another example of various SUs within different respective locations within a DSN including different respectively sets of storage locations therein in accordance with the present invention; and FIG. 10 is a diagram illustrating an embodiment of a method for execution by one or more computing devices in accordance with the present invention.

DETAILED DESCRIPTION OF THE INVENTION

Figure 1:
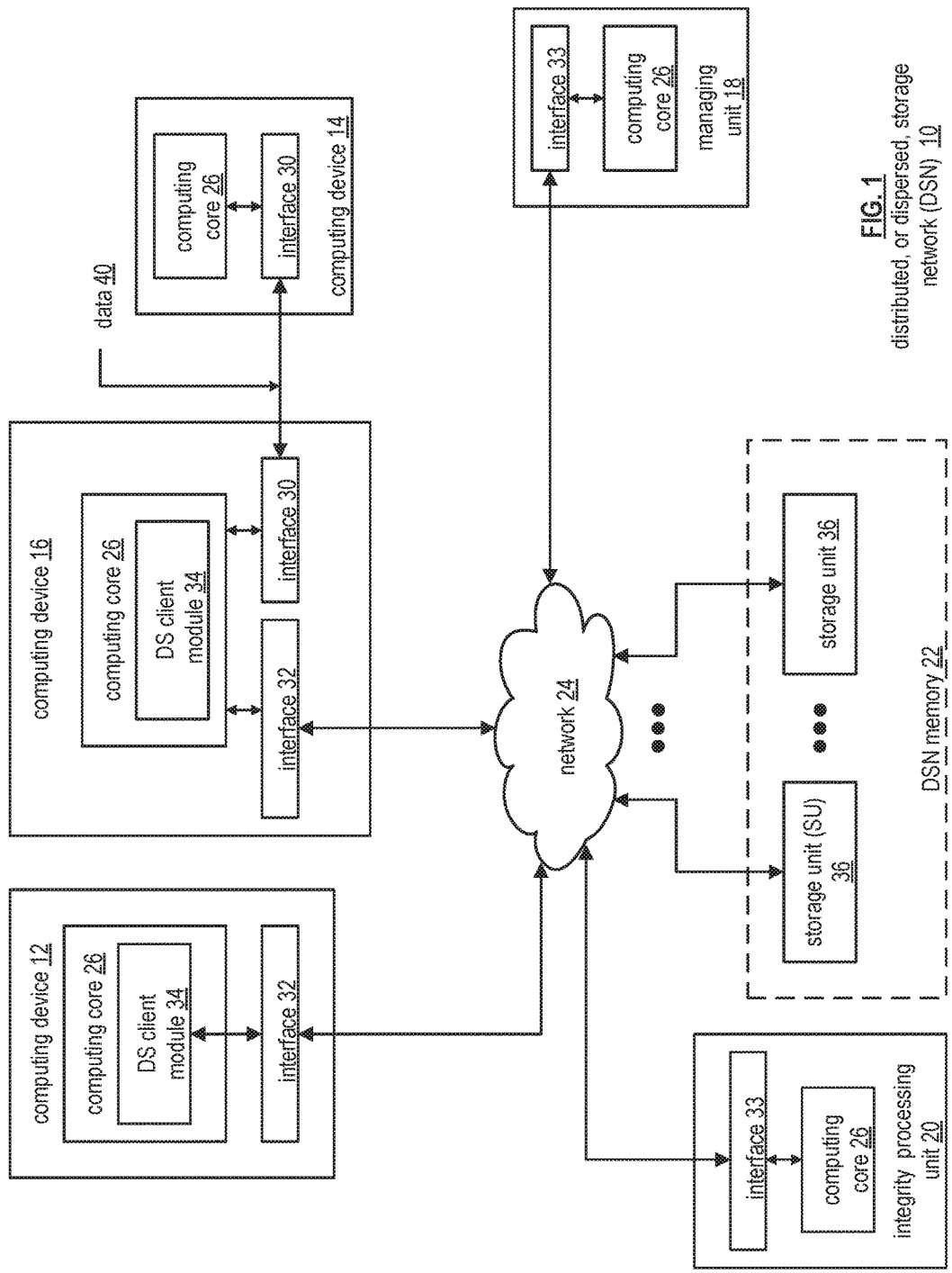
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
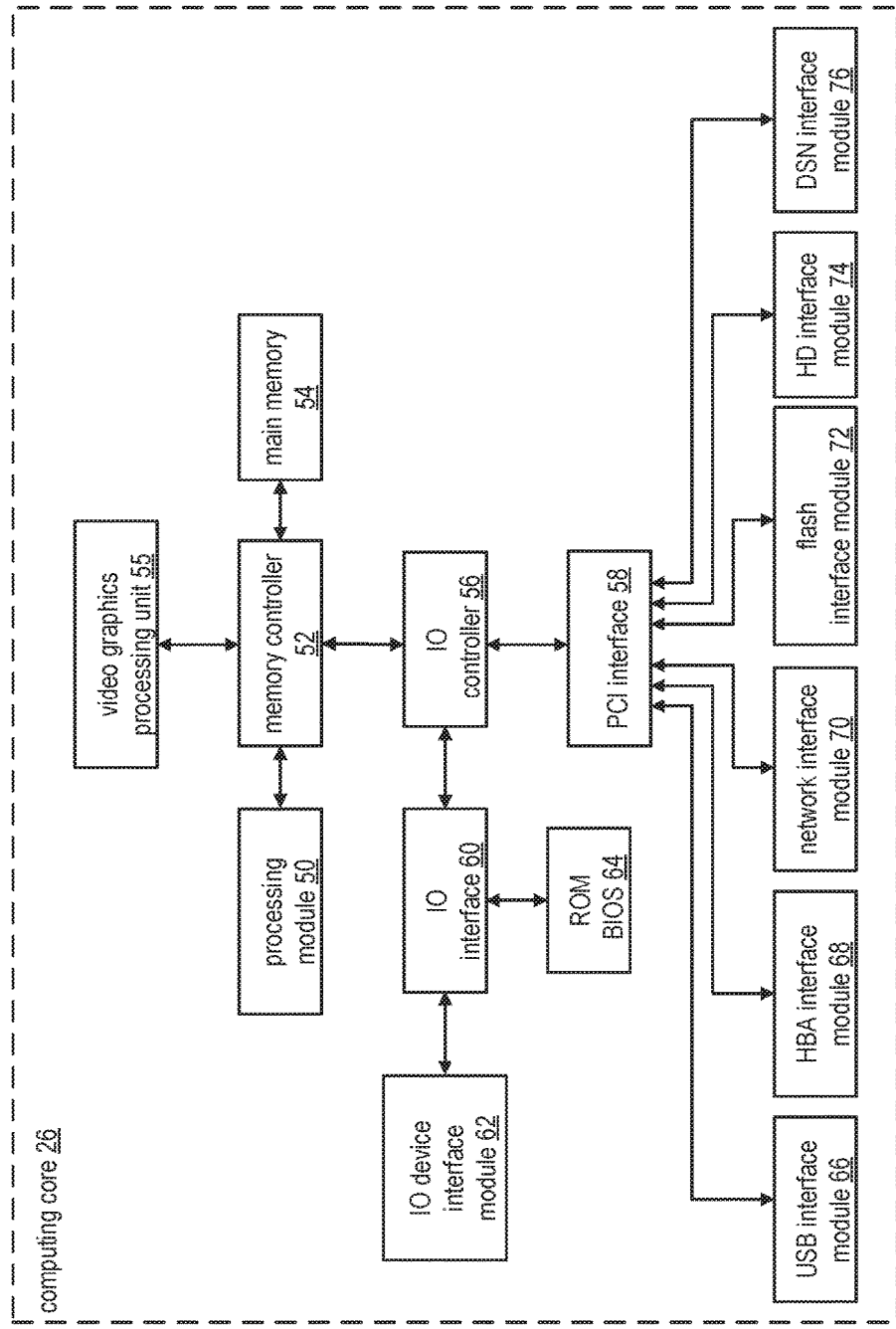
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
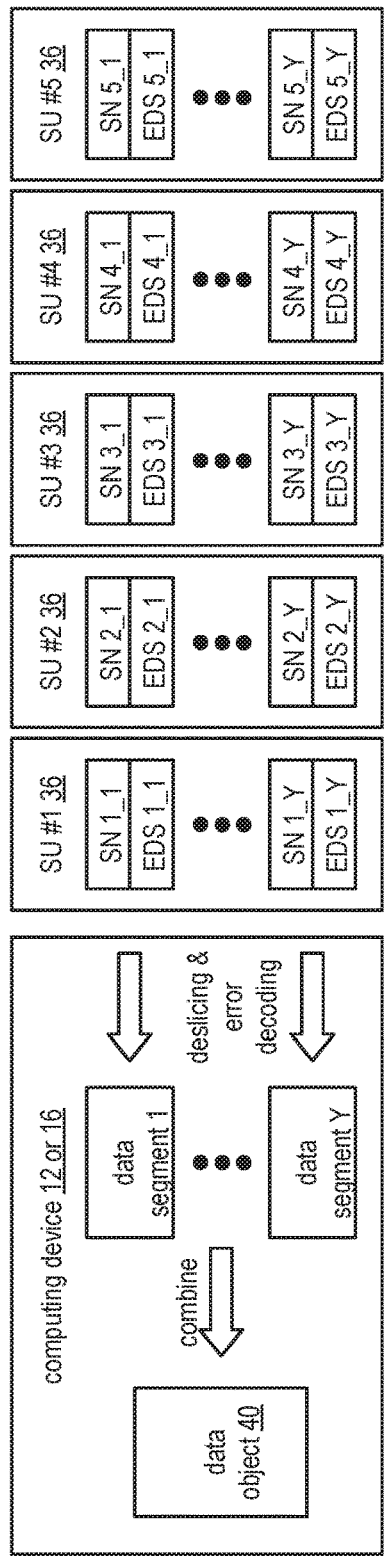
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
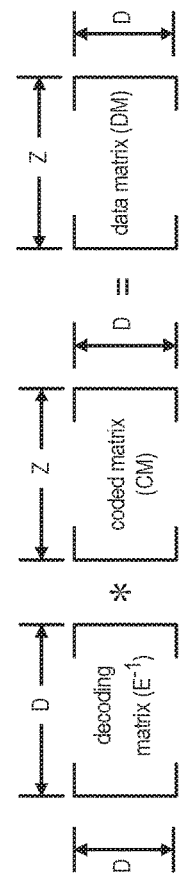
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9A is a schematic block diagram of an example 901 of data storage location management in accordance with the present invention. A computing device includes an interface configured to interface and communicate with a dispersed storage network (DSN), memory that stores operational instructions, and a processing module operably coupled to the interface and to the memory, wherein the processing module, when operable within the computing device based on the operational instructions, is configured to perform various operations, functions, etc.

The computing device operates based on a data object (e.g., encoded data slices (EDSs)) of the data object as shown in block 910. The computing device performs analysis of one or more characteristics of the EDSs of the data object in block 920. Note that the data object is segmented into a plurality of data segments, and a data segment of the plurality of data segments is dispersed error encoded in accordance with dispersed error encoding parameters to produce the plurality of EDSs. Note that a read threshold number of EDSs provides for reconstruction of the data segment, and a write threshold number of EDSs provides for a successful transfer of the plurality of EDSs from a first at least one storage location in the DSN to a second at least one storage location in the DSN.

Then, based on the analysis, the computing device determines a first estimated class from a group of classes for the EDSs based on the one or more characteristics of the EDSs of the data object in block 930. The computing device selects first storage locations within a plurality of storage units (SUs) of the DSN for the EDSs to be distributedly stored based on the first estimated class. Note that the first storage locations are particular storage locations selected from a number of available storage locations (e.g., including the first storage locations and second storage locations and optionally up to $N^{th}$ first storage locations).

Then, the computing device collects write request analytics and/or delete request analytics associated with the EDSs distributedly stored within the plurality of SUs of the DSN during a first period of time and then processes the write request analytics and/or delete request analytics to determine an updated at least one characteristic of the EDSs of the data object in block 940. When the one or more characteristics of the EDSs of the data object compares unfavorably with the updated at least one characteristic of the EDSs of the data object, the computing device determines a second estimated class from the plurality of classes for the EDSs based on the updated at least one characteristic of the EDSs of the data object. Then, the computing device either maintains or switches storage locations for the data object (and/or EDSs).

For example, when the one or more characteristics of the EDSs of the data object compares unfavorably with the updated at least one characteristic of the EDSs of the data object, the computing device selects a second plurality of storage locations within the plurality of SUs of the DSN for the EDSs to be distributedly stored based on the second estimated class and directs the plurality of SUs to move at least the write threshold number of EDSs from the first plurality of storage locations within the plurality of SUs of the DSN to the second plurality of storage locations within the plurality of SUs of the DSN at or during a second period of time. Alternatively, when the one or more characteristics of the EDSs of the data object compares unfavorably with the updated at least one characteristic of the EDSs of the data object, the computing device maintains the EDS to be stored within the first plurality of storage locations within the plurality of SUs.

In some examples, when the at least the write threshold number of EDSs have been moved from the first plurality of storage locations within the plurality of SUs of the DSN to the second plurality of storage locations within the plurality of SUs of the DSN, the computing device operates to direct the plurality of SUs to move any remaining EDSs of the plurality of EDSs from the first plurality of storage locations within the plurality of SUs of the DSN to the second plurality of storage locations within the plurality of SUs of the DSN at or during a third period of time, wherein fewer than all of the plurality of EDSs are moved from the first plurality of storage locations within the plurality of SUs of the DSN to the second plurality of storage locations within the plurality of SUs of the DSN at or during the second period of time.

In even other examples, when the at least one characteristic of the plurality of EDSs of the data object compares favorably with the updated at least one characteristic of the plurality of EDSs of the data object, the computing device is configured to collect additional at least one of write request analytics or delete request analytics associated with the plurality of EDSs distributedly stored within the plurality of SUs of the DSN during a third period of time and process the additional at least one of write request analytics or delete request analytics to determine additional updated at least one characteristic of the plurality of EDSs of the data object. Then, when the at least one characteristic of the plurality of EDSs of the data object compares unfavorably with the additional updated at least one characteristic of the plurality of EDSs of the data object, the computing device is configured to determine the second estimated class or a third estimated class from the plurality of classes for the plurality of EDSs based on the additional updated at least one characteristic of the plurality of EDSs of the data object. The computing device is then configured to select the second plurality of storage locations or a third plurality of storage locations within the plurality of SUs of the DSN for the plurality of EDSs to be distributedly stored based on the second estimated class or the third estimated class and direct the plurality of SUs to move at least the write threshold number of EDSs from the first plurality of storage locations within the plurality of SUs of the DSN to the second plurality of storage locations or the third plurality of storage locations within the plurality of SUs of the DSN at or during a fourth period of time.

Examples of one or more characteristics of the EDSs of the data object may include any one or more of a type of the data object, wherein the type of the data object includes at least one of a data type, a video type, an image or photographic type, an audio type, a text type, a spreadsheet type, a graphics type, or an animation type. In addition, other examples of one or more characteristics of the EDSs of the data object may include any one or more of a user or owner associated with the data object, a user or owner provided hint that is associated with the data object, a size of the data object, metadata associated with the data object, a creation date associated with the data object, a modification date associated with the data object, a modification frequency associated with the data object, an estimated expected lifetime (EL) of at least one EDS of the plurality of EDSs of the data object, wherein the estimated EL of the at least one EDS of the plurality of EDSs of the data object is based on at least one of an update counter, a count of a number instances of the at least one EDS of the plurality of EDSs of the data object in a log file associated with the plurality of EDSs of the data object, or at least one other characteristic of the plurality of EDSs of the data object, and/or a comparison of the EL of the at least one EDS of the plurality of EDSs of the data object to an average log compaction interval (LCI) of the log file associated with the plurality of EDSs of the data object.

In a particular examples, the log file associated with the plurality of EDSs of the data object includes at least one of a file, an offset within a memory device of the DSN, a zone in a shingled magnetic recording (SMR) drive, a chip within a solid state drive (SSD), a position in a tape reel, and/or a logical or physical section that can independently be accessed within the memory device and/or another memory device of the DSN.

Examples of one or more classes for the plurality of EDSs can include one or more of a short lifetime expected lifetime (EL) class that is characterized by at least one of write operation or delete operation performed on the plurality of EDSs of the data object with frequency that compares favorably to a threshold number and a long lifetime EL class that is characterized by the at least one of write operation or delete operation performed on the plurality of EDSs of the data object with frequency that compares unfavorably to the threshold number.

Note that the computing device may be located at a first premises that is remotely located from at least one SU of the plurality of SUs within the DSN. The computing device may be a SU of the plurality of SUs within the DSN. Alternatively, the computing device may be a wireless smart phone, a laptop, a tablet, a personal computers (PC), a work station, and/or a video game device.

FIG. 9B is a schematic block diagram of an example 902 of various storage units (SUs) within different respective locations within a dispersed storage network (DSN) including different respectively sets of storage locations therein in accordance with the present invention. This diagram shows various storage locations that are based respectively on various installations of storage units (SUs) within a DSN. For example, a first installation of SUs includes a first set of SUs (e.g., shown as SU #1 36 and up to SU #m 36 where m is a positive integer) that supports first storage locations within the DSN, a second installation of SUs includes a second set of SUs (e.g., shown as SU #1 36 and up to SU #n 36 where n is a positive integer) that supports second storage locations within the DSN, and an $X^{th}$ installation of SUs includes an $X^{th}$ set of SUs (e.g., shown as SU #1 36 and up to SU #o 36 where m is a positive integer) that supports an $X^{th}$ storage locations within the DSN. Note than each of the various sets of SUs in the various installations may include a same number of SUs or different respective numbers of SUs.

FIG. 9C is a schematic block diagram of another example 903 of various SUs within different respective locations within a DSN including different respectively sets of storage locations therein in accordance with the present invention. This diagram shows various storage locations that are based on different respective SUs selected from the different respective sets of SUs within various installations of SUs within a DSN. For example, a first installation of SUs includes a first set of SUs (e.g., shown as SU #1 36 and up to SU #m 36 where m is a positive integer), a second installation of SUs includes a second set of SUs (e.g., shown as SU #1 36 and up to SU #n 36 where n is a positive integer), and an $X^{th}$ installation of SUs includes an $X^{th}$ set of SUs (e.g., shown as SU #1 36 and up to SU #o 36 where m is a positive integer). Note than each of the various sets of SUs in the various installations may include a same number of SUs or different respective numbers of SUs. In this diagram, the first storage locations within the DSN are based on at least one SU respectively selected within the first installation of SUs, the second installation of SUs, and so on. Also, the second storage locations within the DSN are based on at least one SU respectively selected within the first installation of SUs, the second installation of SUs, and so on. In general, $X^{th}$ storage locations within the DSN are based on at least one SU respectively selected within the first installation of SUs, the second installation of SUs, and so on. While various examples herein show that different respective storage locations are based on more than one SU (whether co-located or separately and remotely located with respect to each other), note that as few as one SU may include first and second storage locations therein.

In an example of operation and implementation, memory devices (or paradigms of storage within a DSN such as SUs therein) may operate most efficiently in an append-only or append-heavy workload. For example, hard drives, SMR (Shingled Magnetic Recording) drives, solid state drives (SSDs), Tape Drives, and other memory devices may be implemented within a DSN to store data. Similarly, some mechanisms for storing slices (e.g., EDSs), Packed Slice Storage (PSS), and Zone Slice Storage (ZSS) are designed such that most or all new writes are done in a way that they are appended to a sequential "log". Such forms of storage naturally lead to a situation where overwrites or deletes of slices create "holes" in the log. The log will continue to hold content that is no longer active data (such as old revisions of slices that have been finalized or undone, or overwritten by delete markers). To reclaim the space associated with the holes while continuing to operate in an "append only" mode can require re-writing the long but skipping any entries associated with deleted or obsolesced slices. However, note that such operations can lead to large inefficiencies when slices of two different classes ends up within the same log.

This disclosure presents a novel manner of operation in which slices are classified into at least two distinct classes. For example, a first class may include slice revisions that are almost never overwritten or quickly deleted (e.g., those slices having a very long expected lifetime). A second class may include slice revisions that are frequently overwritten or quickly deleted e.g., those slices having comparatively short expected lifetime).

When the expected lifetime (EL) of a slice's revision is much longer than the average "log compaction interval" (LCI) of the log file to which it is stored, then that slice revision will need to be rewritten possibly many times, as it is carried forward with each compaction of the log it is stored within. Conversely, if the EL of a slice's revisions is very short compared to the LCI of the log it is in, then it is likely that many such revisions of that slice will exist in the same log, and therefore all but one of those instances will be reclaimed upon compaction.

Considering an example with two different classes, when slice revisions of two different classes (both class 1 and class 2) are grouped into the same logs, the class 2 slices (e.g., those frequently creating holes that lead to compaction) makes compaction very frequent and lowers the LCI of the log. However, the class 1 slices must inefficiently be copied with each log compaction. Conversely, if the classes of data are separated such that class 1 slices all goes into a log file with other class 1 slices, and class 2 slices all go into a log file with other class 2 slices, there may be substantial benefits. For example, the long EL of slices stored in the log storing class 1 slices means holes are very infrequently created in the class 1 log. In this situation, compaction for such logs may almost never happen (e.g., because there is a long LCI) and the inefficient compactions are very infrequent. In addition, the short EL of slices stored in the log storing class 2 slices means holes are very frequently created in the class 2 log. In this situation, compaction may be frequent (e.g., because there is a short LCI). However, while compaction may be frequent, such compactions may be very efficient since there will be a large number of holes in the log, and only a small proportion of the slices in the log will be "live" and need to be copied into the new log during compaction.

A device (e.g., computing device, DS processing unit, etc.) may use this property to optimally choose a location of where to place a slice. Every slice, which may map to at least 2 logs, may be ordered in relation to an expected EL of the slices. Note also that the estimate of the EL of a slice may be based on various things including one or more of an update counter, a count of how many instances of that slice exist in the log file, an analysis of the average time between update for that slice as found in the log, a last modification time, a storage type, and/or a requester-provided hint. Depending on the estimated EL, the device (e.g., computing device, DS processing unit, etc.) decides which log is most appropriate to store the slice into in order to optimize the efficiency, frequency, or a combination of both for log compaction. Note that each "log" may be a file, an offset within a memory device, a zone in a SMR drive, a chip within an SSD, a position in a tape reel, and/or other logical or physical section that may be independently accessed within a memory device.

FIG. 10 is a diagram illustrating an embodiment of a method 1000 for execution by one or more computing devices in accordance with the present invention. The method 1000 operates by determining at least one characteristic of a plurality of encoded data slices (EDSs) of a data object in step 1010. Note that the data object is segmented into a plurality of data segments, and a data segment of the plurality of data segments is dispersed error encoded in accordance with dispersed error encoding parameters to produce the plurality of EDSs. Also, a read threshold number of EDSs provides for reconstruction of the data segment, and a write threshold number of EDSs provides for a successful transfer of the plurality of EDSs from a first at least one storage location in a dispersed storage network (DSN) to a second at least one storage location in the DSN. The method 1000 then operates by determining a first estimated class from a plurality of classes for the plurality of EDSs based on the at least one characteristic of a plurality of EDSs of the data object in step 1020. The method 1000 then continues by selecting a first plurality of storage locations within a plurality of storage units (SUs) of the DSN for the plurality of EDSs to be distributedly stored based on the first estimated class in step 1030. The method 1000 then operates by collecting at least one of write request analytics or delete request analytics associated with the plurality of EDSs distributedly stored within the plurality of SUs of the DSN during a first period of time in step 1040. The method 1000 then continues by processing the at least one of write request analytics or delete request analytics to determine an updated at least one characteristic of the plurality of EDSs of the data object in step 1050.

Then, the method 1000 operates by determining a second estimated class from the plurality of classes for the plurality of EDSs based on the updated at least one characteristic of the plurality of EDSs of the data object in step 1060. When the at least one characteristic of the plurality of EDSs of the data object compares unfavorably with the updated at least one characteristic of the plurality of EDSs of the data object as determined in step 1070, the method 1000 operates by determining a second estimated class from the plurality of classes for the plurality of EDSs based on the updated at least one characteristic of the plurality of EDSs of the data object in step 1080. Then, the method 100 operates by selecting a second plurality of storage locations within the plurality of SUs of the DSN for the plurality of EDSs to be distributedly stored based on the second estimated class and directing the plurality of SUs to move at least the write threshold number of EDSs from the first plurality of storage locations within the plurality of SUs of the DSN to the second plurality of storage locations within the plurality of SUs of the DSN at or during a second period of time in step 1084.

Alternatively, when the at least one characteristic of the plurality of EDSs of the data object compares favorably with the updated at least one characteristic of the plurality of EDSs of the data object as determined in step 1070, the method 1000 operates by maintaining the first storage locations for the data object (and/or EDSs of the data object) and maintaining storing them therein in step 1090.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed storage network (DSN), wherein the DSN includes at least one of a wireless communication system, a wire lined communication system, a non-public intranet system, a public internet system, a local area network (LAN), or a wide area network (WAN);
memory that stores operational instructions; and a processing module operably coupled to the interface and to the memory, wherein the processing module, when operable within the computing device based on the operational instructions, is configured to:

determine at least one characteristic of a plurality of encoded data slices (EDSs) of a data object, wherein the data object is segmented into a plurality of data segments, wherein a data segment of the plurality of data segments is dispersed error encoded in accordance with dispersed error encoding parameters to produce the plurality of EDSs, wherein a read threshold number of EDSs provides for reconstruction of the data segment, and wherein a write threshold number of EDSs provides for a successful transfer of the plurality of EDSs from a first at least one storage location in the DSN to a second at least one storage location in the DSN;

determine a first estimated class from a plurality of classes for the plurality of EDSs based on the at least one characteristic of a plurality of EDSs of the data object;

select a first plurality of storage locations within a plurality of storage units (SUs) of the DSN for the plurality of EDSs to be distributedly stored based on the first estimated class;

collect at least one of write request analytics or delete request analytics associated with the plurality of EDSs distributedly stored within the plurality of SUs of the DSN during a first period of time;

process the at least one of write request analytics or delete request analytics to determine an updated at least one characteristic of the plurality of EDSs of the data object;

when the at least one characteristic of the plurality of EDSs of the data object compares unfavorably with the updated at least one characteristic of the plurality of EDSs of the data object:

determine a second estimated class from the plurality of classes for the plurality of EDSs based on the updated at least one characteristic of the plurality of EDSs of the data object;

select a second plurality of storage locations within the plurality of SUs of the DSN for the plurality of EDSs to be distributedly stored based on the second estimated class; and direct the plurality of SUs to move at least the write threshold number of EDSs from the first plurality of storage locations within the plurality of SUs of the DSN to the second plurality of storage locations within the plurality of SUs of the DSN at or during a second period of time.

2. The computing device of claim 1, wherein the processing module, when operable within the computing device based on the operational instructions, is further configured to:

when the at least the write threshold number of EDSs have been moved from the first plurality of storage locations within the plurality of SUs of the DSN to the second plurality of storage locations within the plurality of SUs of the DSN, direct the plurality of SUs to move any remaining EDSs of the plurality of EDSs from the first plurality of storage locations within the plurality of SUs of the DSN to the second plurality of storage locations within the plurality of SUs of the DSN at or during a third period of time, wherein fewer than all of the plurality of EDSs are moved from the first plurality of storage locations within the plurality of SUs of the DSN to the second plurality of storage locations within the plurality of SUs of the DSN at or during the second period of time.

3. The computing device of claim 1, wherein the processing module, when operable within the computing device based on the operational instructions, is further configured, when the at least one characteristic of the plurality of EDSs of the data object compares favorably with the updated at least one characteristic of the plurality of EDSs of the data object, to:

collect additional at least one of write request analytics or delete request analytics associated with the plurality of EDSs distributedly stored within the plurality of SUs of the DSN during a third period of time;

process the additional at least one of write request analytics or delete request analytics to determine additional updated at least one characteristic of the plurality of EDSs of the data object;

when the at least one characteristic of the plurality of EDSs of the data object compares unfavorably with the additional updated at least one characteristic of the plurality of EDSs of the data object:

determine the second estimated class or a third estimated class from the plurality of classes for the plurality of EDSs based on the additional updated at least one characteristic of the plurality of EDSs of the data object;

select the second plurality of storage locations or a third plurality of storage locations within the plurality of SUs of the DSN for the plurality of EDSs to be distributedly stored based on the second estimated class or the third estimated class; and direct the plurality of SUs to move at least the write threshold number of EDSs from the first plurality of storage locations within the plurality of SUs of the DSN to the second plurality of storage locations or the third plurality of storage locations within the plurality of SUs of the DSN at or during a fourth period of time.

4. The computing device of claim 1, wherein the at least one characteristic of the plurality of EDSs of the data object includes at least one of:

a type of the data object, wherein the type of the data object includes at least one of a data type, a video type, an image or photographic type, an audio type, a text type, a spreadsheet type, a graphics type, or an animation type;

a user or owner associated with the data object;

a user or owner provided hint that is associated with the data object;

a size of the data object;

metadata associated with the data object;

a creation date associated with the data object;

a modification date associated with the data object;

a modification frequency associated with the data object;

an estimated expected lifetime (EL) of at least one EDS of the plurality of EDSs of the data object, wherein the estimated EL of the at least one EDS of the plurality of EDSs of the data object is based on at least one of an update counter, a count of a number instances of the at least one EDS of the plurality of EDSs of the data object in a log file associated with the plurality of EDSs of the data object, or at least one other characteristic of the plurality of EDSs of the data object; or a comparison of the EL of the at least one EDS of the plurality of EDSs of the data object to an average log compaction interval (LCI) of the log file associated with the plurality of EDSs of the data object.

5. The computing device of claim 4, wherein the log file associated with the plurality of EDSs of the data object includes at least one of a file, an offset within a memory device of the DSN, a zone in a shingled magnetic recording (SMR) drive, a chip within a solid state drive (SSD), a position in a tape reel, or a logical or physical section that can independently be accessed within the memory device or another memory device of the DSN.

6. The computing device of claim 1, wherein the plurality of classes for the plurality of EDSs includes:
a short lifetime expected lifetime (EL) class that is characterized by at least one of write operation or delete operation performed on the plurality of EDSs of the data object with frequency that compares favorably to a threshold number; and
a long lifetime EL class that is characterized by the at least one of write operation or delete operation performed on the plurality of EDSs of the data object with frequency that compares unfavorably to the threshold number.

7. The computing device of claim 1, wherein the computing device is located at a first premises that is remotely located from at least one SU of the plurality of SUs within the DSN.

8. The computing device of claim 1 further comprising:
a SU of the plurality of SUs within the DSN.

9. The computing device of claim 1 further comprising:
a wireless smart phone, a laptop, a tablet, a personal computers (PC), a work station, or a video game device.

10. A method for execution by a computing device, the method comprising:
determining at least one characteristic of a plurality of encoded data slices (EDSs) of a data object, wherein the data object is segmented into a plurality of data segments, wherein a data segment of the plurality of data segments is dispersed error encoded in accordance with dispersed error encoding parameters to produce the plurality of EDSs, wherein a read threshold number of EDSs provides for reconstruction of the data segment, and wherein a write threshold number of EDSs provides for a successful transfer of the plurality of EDSs from a first at least one storage location in a dispersed storage network (DSN) to a second at least one storage location in the DSN, wherein the DSN includes at least one of a wireless communication system, a wire lined communication systems, a non-public intranet system, a public internet system, a local area network (LAN), or a wide area network (WAN);
determining a first estimated class from a plurality of classes for the plurality of EDSs based on the at least one characteristic of a plurality of EDSs of the data object;
selecting a first plurality of storage locations within a plurality of storage units (SUs) of the DSN for the plurality of EDSs to be distributedly stored based on the first estimated class;
collecting at least one of write request analytics or delete request analytics associated with the plurality of EDSs distributedly stored within the plurality of SUs of the DSN during a first period of time;
processing the at least one of write request analytics or delete request analytics to determine an updated at least one characteristic of the plurality of EDSs of the data object;

when the at least one characteristic of the plurality of EDSs of the data object compares unfavorably with the updated at least one characteristic of the plurality of EDSs of the data object:
determining a second estimated class from the plurality of classes for the plurality of EDSs based on the updated at least one characteristic of the plurality of EDSs of the data object;
selecting a second plurality of storage locations within the plurality of SUs of the DSN for the plurality of EDSs to be distributedly stored based on the second estimated class; and
directing the plurality of SUs to move at least the write threshold number of EDSs from the first plurality of storage locations within the plurality of SUs of the DSN to the second plurality of storage locations within the plurality of SUs of the DSN at or during a second period of time.

11. The method of claim 10 further comprising:
directing, when the at least the write threshold number of EDSs have been moved from the first plurality of storage locations within the plurality of SUs of the DSN to the second plurality of storage locations within the plurality of SUs of the DSN, the plurality of SUs to move any remaining EDSs of the plurality of EDSs from the first plurality of storage locations within the plurality of SUs of the DSN to the second plurality of storage locations within the plurality of SUs of the DSN at or during a third period of time, wherein fewer than all of the plurality of EDSs are moved from the first plurality of storage locations within the plurality of SUs of the DSN to the second plurality of storage locations within the plurality of SUs of the DSN at or during the second period of time.

12. The method of claim 10 further comprising, when the at least one characteristic of the plurality of EDSs of the data object compares favorably with the updated at least one characteristic of the plurality of EDSs of the data object:
collecting additional at least one of write request analytics or delete request analytics associated with the plurality of EDSs distributedly stored within the plurality of SUs of the DSN during a third period of time;
processing the additional at least one of write request analytics or delete request analytics to determine additional updated at least one characteristic of the plurality of EDSs of the data object;
when the at least one characteristic of the plurality of EDSs of the data object compares unfavorably with the additional updated at least one characteristic of the plurality of EDSs of the data object:
determining the second estimated class or a third estimated class from the plurality of classes for the plurality of EDSs based on the additional updated at least one characteristic of the plurality of EDSs of the data object;
selecting the second plurality of storage locations or a third plurality of storage locations within the plurality of SUs of the DSN for the plurality of EDSs to be distributedly stored based on the second estimated class or the third estimated class; and
directing the plurality of SUs to move at least the write threshold number of EDSs from the first plurality of storage locations within the plurality of SUs of the DSN to the second plurality of storage locations or the third plurality of storage locations within the plurality of SUs of the DSN at or during a fourth period of time.

13. The method of claim 10, wherein the at least one characteristic of the plurality of EDSs of the data object includes at least one of:
- a type of the data object, wherein the type of the data object includes at least one of a data type, a video type, an image or photographic type, an audio type, a text type, a spreadsheet type, a graphics type, or an animation type;
- a user or owner associated with the data object;
- a user or owner provided hint that is associated with the data object;
- a size of the data object;
- metadata associated with the data object;
- a creation date associated with the data object;
- a modification date associated with the data object;
- a modification frequency associated with the data object;
- an estimated expected lifetime (EL) of at least one EDS of the plurality of EDSs of the data object, wherein the estimated EL of the at least one EDS of the plurality of EDSs of the data object is based on at least one of an update counter, a count of a number instances of the at least one EDS of the plurality of EDSs of the data object in a log file associated with the plurality of EDSs of the data object, or at least one other characteristic of the plurality of EDSs of the data object; or
- a comparison of the EL of the at least one EDS of the plurality of EDSs of the data object to an average log compaction interval (LCI) of the log file associated with the plurality of EDSs of the data object.

14. The method of claim 13, wherein the log file associated with the plurality of EDSs of the data object includes at least one of a file, an offset within a memory device of the DSN, a zone in a shingled magnetic recording (SMR) drive, a chip within a solid state drive (SSD), a position in a tape reel, or a logical or physical section that can independently be accessed within the memory device or another memory device of the DSN.

15. The method of claim 10, wherein the plurality of classes for the plurality of EDSs includes:
- a short lifetime expected lifetime (EL) class that is characterized by at least one of write operation or delete operation performed on the plurality of EDSs of the data object with frequency that compares favorably to a threshold number; and
- a long lifetime EL class that is characterized by the at least one of write operation or delete operation performed on the plurality of EDSs of the data object with frequency that compares unfavorably to the threshold number.

16. The method of claim 10, wherein the computing device is located at a first premises that is remotely located from at least one SU of the plurality of SUs within the DSN.

17. The method of claim 10, wherein the computing device includes a SU of the plurality of SUs within the DSN.

18. The method of claim 10, wherein the computing device includes a wireless smart phone, a laptop, a tablet, a personal computers (PC), a work station, or a video game device.

19. A method for execution by a computing device, the method comprising:
- determining at least one characteristic of a plurality of encoded data slices (EDSs) of a data object, wherein the data object is segmented into a plurality of data segments, wherein a data segment of the plurality of data segments is dispersed error encoded in accordance with dispersed error encoding parameters to produce the plurality of EDSs, wherein a read threshold number of EDSs provides for reconstruction of the data segment, and wherein a write threshold number of EDSs provides for a successful transfer of the plurality of EDSs from a first at least one storage location in a dispersed storage network (DSN) to a second at least one storage location in the DSN, wherein the computing device includes a wireless smart phone, a laptop, a tablet, a personal computers (PC), a work station, or a video game device;
- determining a first estimated class from a plurality of classes for the plurality of EDSs based on the at least one characteristic of a plurality of EDSs of the data object;
- selecting a first plurality of storage locations within a plurality of storage units (SUs) of the DSN for the plurality of EDSs to be distributedly stored based on the first estimated class;
- collecting at least one of write request analytics or delete request analytics associated with the plurality of EDSs distributedly stored within the plurality of SUs of the DSN during a first period of time;
- processing the at least one of write request analytics or delete request analytics to determine an updated at least one characteristic of the plurality of EDSs of the data object;
- when the at least one characteristic of the plurality of EDSs of the data object compares unfavorably with the updated at least one characteristic of the plurality of EDSs of the data object:
- determining a second estimated class from the plurality of classes for the plurality of EDSs based on the updated at least one characteristic of the plurality of EDSs of the data object;
- selecting a second plurality of storage locations within the plurality of SUs of the DSN for the plurality of EDSs to be distributedly stored based on the second estimated class; and
- directing the plurality of SUs to move at least the write threshold number of EDSs from the first plurality of storage locations within the plurality of SUs of the DSN to the second plurality of storage locations within the plurality of SUs of the DSN at or during a second period of time.

* * * * *